(12) United States Patent
Fang

(10) Patent No.: US 8,057,074 B2
(45) Date of Patent: Nov. 15, 2011

(54) LED STREET LIGHT

(76) Inventor: Li Rong Fang, Shenzhen (CN)

( * ) Notice: Subject to any disclaimer, the term of this patent is extended or adjusted under 35 U.S.C. 154(b) by 262 days.

(21) Appl. No.: 12/356,553

(22) Filed: Jan. 21, 2009

(65) Prior Publication Data

US 2010/0182795 A1 Jul. 22, 2010

(51) Int. Cl.
*F21V 7/00* (2006.01)
(52) U.S. Cl. .......... 362/373; 362/294; 362/249.11; 362/249.02; 362/800
(58) Field of Classification Search .......... 362/249.02, 362/249.11, 373, 294, 800
See application file for complete search history.

(56) References Cited

U.S. PATENT DOCUMENTS

| | | | |
|---|---|---|---|
| 7,674,012 B1* | 3/2010 | Lin et al. | 362/249.02 |
| 7,682,055 B2* | 3/2010 | Shuai et al. | 362/373 |
| 7,699,298 B2* | 4/2010 | Shen et al. | 269/47 |
| 7,699,498 B2* | 4/2010 | Zheng | 362/249.02 |
| 7,712,923 B2* | 5/2010 | Huang et al. | 362/267 |
| 7,758,211 B2* | 7/2010 | Zheng et al. | 362/249.02 |
| 7,771,087 B2* | 8/2010 | Wilcox et al. | 362/294 |
| 7,785,211 B2* | 8/2010 | Hackenberg | 473/256 |

\* cited by examiner

*Primary Examiner* — Anabel Ton

(57) ABSTRACT

This invention relates to a kind of LED light, comprising: front housing, rear housing, light pole fixation base, clear cap; also comprising the transformer fixed on the rear housing and the LED panel connected with the front housing; there are couples of heat sinks on external surface of the rear housing; the internal surface of the foresaid front housing is equipped with minimum one slot with couples of heat sinks in; the heat sinks are designed for conducting heat from the LED light panel to the air for timely eliminating heat for the LED. By this way, it guarantees a sufficient heat elimination for the LED street light achieving a longer lifespan of the LED street light and a less light degradation that can be even neglected. Therefore, the brightness of the LED street light is ensured.

13 Claims, 6 Drawing Sheets

LED STREET LIGHT

TECHNICAL FIELD

This invention relates to a kind of street light, a street light taking LED as light source in particular.

BACKGROUND ART

Applying the principle of aluminum alloy conduction for heat elimination, the existing LED street light are troubled with the following shortcomings: when the metal of copper or aluminum alloy is used for connecting the LED light panel with ballast, heat sinks of the LED and ballast will lower the temperature of the LED light and the ballast. In case of more than 32 LED lights, this kind of heat elimination can not effectively conduct the temperature from LED and ballast to the air. That causes a temperature in the integrated light box over 70° C. When the LED street lights are integrated together with surface sealed and temperature goes high, the LED will be in fast degradation until it goes out.

BRIEF SUMMARY OF THE INVENTION

Objective of this invention is to provide a kind of street light having solved the problem heat elimination troubling the traditional LED street light and prolonging lifespan of the LED street light.

For achieving the objective above, this invention adopts the following technical scheme: A LED street light comprising front housing, rear housing, light pole fixation base, clear cap, characterized in that: it also comprises the transformer fixed on the rear housing and the LED panel connected with the front housing; there are couples of heat sinks on external surface of the rear housing; the internal surface of the foresaid front housing is equipped with minimum one slot with couples of heat sinks in; on internal surface of the foresaid front housing, there is minimum one slot corresponding to the slot equipped on the foresaid front housing internal surface; the foresaid slot is arch in shape. Couples of heat sinks are equipped in slot on internal surface of the front housing. The heat sinks are designed for conducting heat from the LED light panel to the air for timely eliminating heat from the LED. In practice, there are couples of corresponding slots with arch section on the surface at which the front panel and the rear panel contacts, and their lengths are the same as that of the front panel and rear panel respectively. Therefore, when the front panel combines with the rear panel, couples of through-holes are formed. There are couples of heat sinks equipped in the each arch slot in the front housing. By this way, the heat of LED light panel is timely eliminated.

On the foresaid LED street light, minimum two T-shaped convex bars are equipped on the internal surface of the foresaid front housing; while minimum two T-shaped slots corresponding to the foresaid T-shaped bars are equipped on the internal surface of the rear housing. This structure is designed for the convenience of fixing the front housing with the rear housing.

On the foresaid LED street light, the foresaid clear light cap is equipped on the front housing. A reflector is installed between the clear light cap and the LED light panel for equal light transmission from the LED.

On the foresaid LED street light, couples of heat sinks are equipped in the arch shaped slot on the internal surface of the foresaid rear housing. All the free ends of the foresaid heat sinks are equipped contacting each other in the arch shaped slot on the internal surface of the front housing.

On the foresaid LED street light, there are two foresaid light pole fixation bases. A distribution box is installed between the light pole fixation base and the transformer.

A LED street light, comprising: main unit of the street light, light pole fixation base, clear light cap; also comprising the transformer equipped on the main unit of the street light and the LED light panel connected with the other surface. Couples of heat sinks are installed on surface of the transformer equipped on the main unit of the street light, characterized in that: minimum one through-hole is equipped in the main unit of the foresaid street light, and there are several heat sinks equipped in each through-hole.

On the foresaid LED street light, section of the foresaid through-hole is ellipse in shape. Length of the through-hole is the same as that of the main unit of the street light.

On the foresaid LED street light, the foresaid clear light cap is equipped on the front housing; a reflector is equipped between the clear light cap and the LED light panel.

On the foresaid LED street light, the foresaid heat sinks are equipped on surface of the upper part of the foresaid through-hole, and all the free ends of the heat sinks contacts with surface of lower part of the through-hole; or, the foresaid heat sinks are equipped on surface of lower part of the ellipse through-hole, and all the free ends of the heat sinks contacts with surface of upper part of the through-hole.

On the foresaid LED street light, there are two foresaid light pole fixation bases. A distribution box is installed between the light pole fixation base and the transformer.

In virtue of the structure above, because the arch slot on the front housing is in the same diameter as the arch slot on the rear housing, one or more through-hole(s) will be formed when the front housing combines with the rear housing; or another result caused: the front housing integrates with the rear housing; one or more through-hole(s) with couples of heat sinks are equipped in the integrated unit; heat from the LED light assembly is conducted to the front housing through the light panel; the front housing conducts the heat to the through-hole through the heat sinks equipped on it; finally, the heat is conducted to the air. In addition, because an angle of 15° if formed between the street light and the street light pole by installation, part of the heat is discharged to the air via the through-hole, and the other part of heat conducted to the rear housing is discharged via the heat sinks equipped on the rear housing. By this way, it guarantees a sufficient heat elimination for the LED street light achieving a longer lifespan of the LED street light and a less light degradation that can be even neglected. Therefore, the brightness of the LED street light is ensured.

MODE OF CARRYING OUT THE INVENTION

Figure 1:
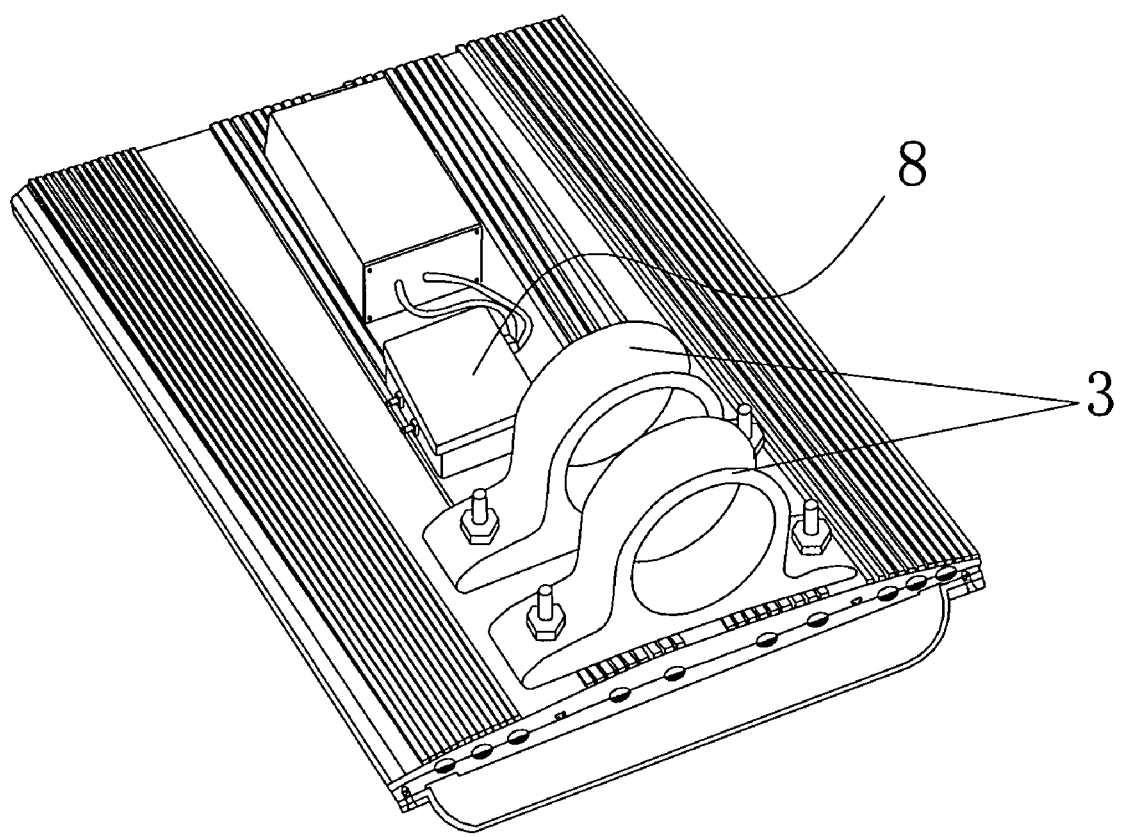
FIG. 1 is a 3-D view of the LED street light of this invention.
Figure 2:
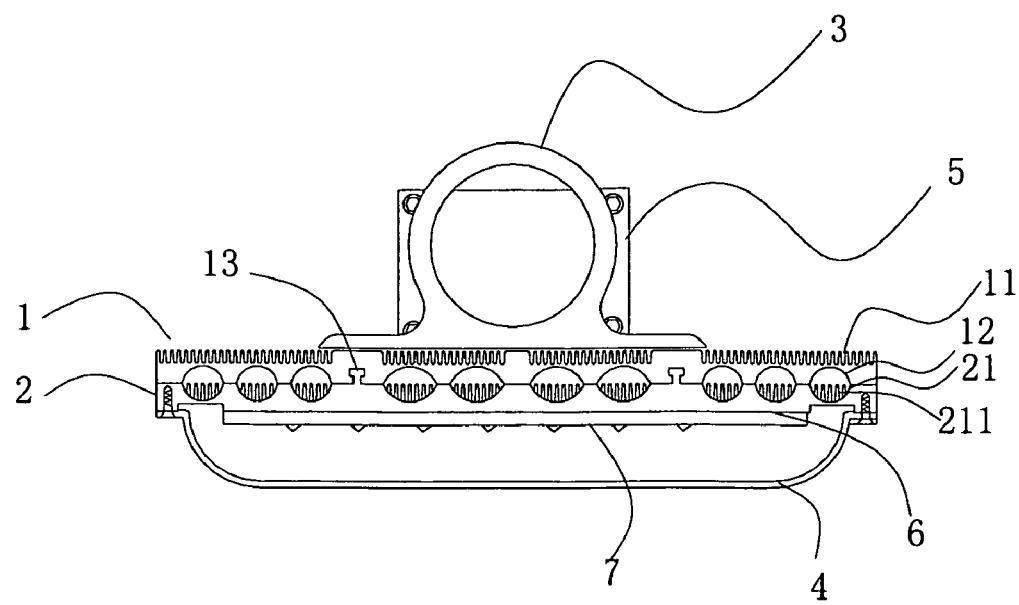
FIG. 2 is a view of the LED street light section of this invention.
Figure 2A:
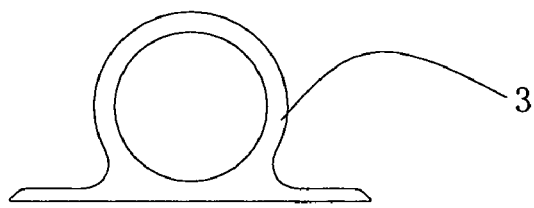
FIG. 2A is an exploded view of FIG. 2.
Figure 2A:
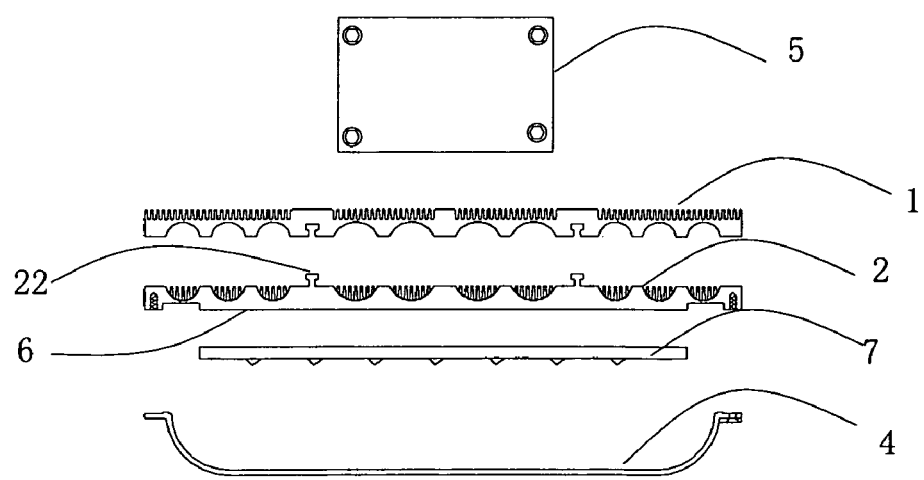

For better understanding of the invention by technicians in this field, further explanation to the invention is stated below combining with the attached figures. As shown in FIGS. 1-2A, this invention discloses a kind of LED street light, comprising front housing, rear housing, light pole fixation base, clear cap, characterized in that: rear housing 1, front housing 2, light pole fixation base 3 and clear light cap 4. On it:

Transformer 5 is equipped on the external surface of the rear housing 1; the LED light panel is fixed on the front housing 2.

There are couples of heat sinks 11 on external surface of the rear housing 1; the internal surface of the foresaid front housing is equipped with couples of arch slots; the section of the foresaid arch slot is arch in shape, and its length is the same as that of the rear housing 1; the internal surface at which the foresaid front housing 2 contacts with the rear housing 1 (meaning the internal surface of the front housing 2) is equipped with arch slots in same quality of the arch slots 12; the arch slot 12 are absolutely the same as the arch slots 21; couples of heat sinks 211 are equipped in each arch slot 12. The heat sinks are made of aluminum with excellent heat eliminating performance.

The clear light cap 4 is fixed on the front housing 2, which is free from lowering the brightness of LED light and prevents rainwater from coming into the LED street light. The reflector 7 is installed between the clear light cap 4 and the LED light panel 6. The foresaid reflector 7 is designed for equal light transmission from the LED. For the convenience of connecting the front housing 2 with the rear housing 1, two T-shaped convex bars 22 are equipped on the internal surface of the front housing; while minimum two T-shaped slots 13 corresponding to the foresaid T-shaped convex bars 22 are equipped on the internal surface of the rear housing 1. This structure is designed for the convenience of fixing the front housing with the rear housing.

With this structure adopted, when the arch slot on the front housing 2 combines with the arch slot on the rear housing 1, a through-hole is formed. The heat LED lighting is conducted to the heat sinks 211 through the LED light panel 6 made of the high thermal conductive materials. The heat sinks conduct the heat to air from the through-hole; and the other part of heat conducted to the rear housing 1 is discharged via the heat sinks 11 equipped on the rear housing. By this way, it guarantees a sufficient heat elimination for the LED street light achieving a longer lifespan of the LED street light and a less light degradation that can be even neglected. Therefore, the brightness of the LED street light is ensured.

There are two foresaid light pole fixation bases with the aim of: when the invention is used in the place of special landform with frequent wind or high wind scale like seaside or peak of mountain, it is recommended to enhance the intensity of tension for the light pole fixation base 3; a distribution box 8 is installed between the light pole fixation base 3 and the transformer 5 mainly for preventing oxidation of power cord coating and waterproof, and for prolonging lifespan of the whole LED street light.

Figure 3:
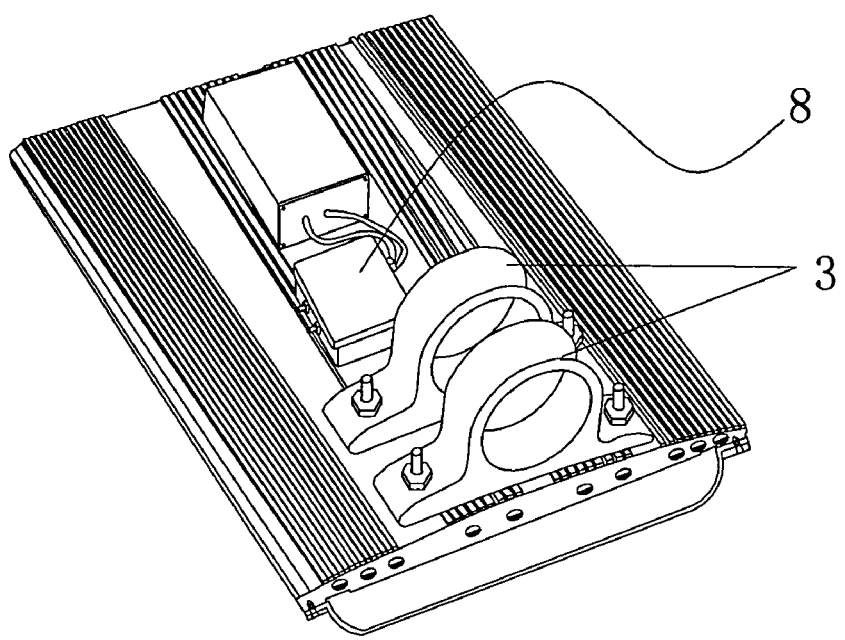
FIG. 3 is a 3-D view of the LED street light with integrated front housing with the rear housing of this invention.
Figure 4:
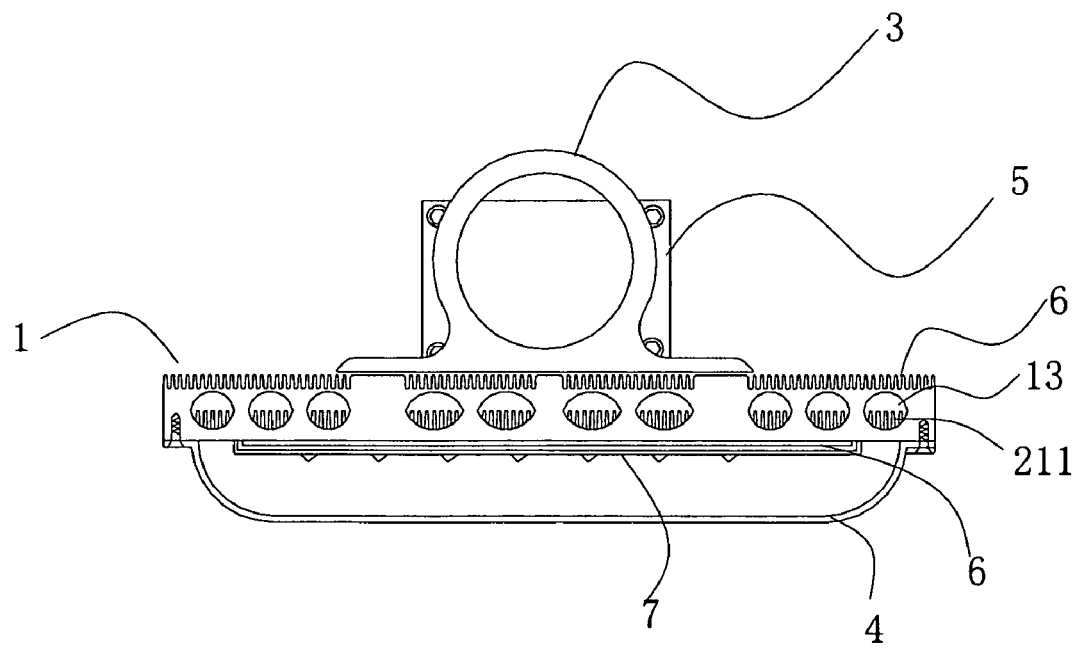
FIG. 4 is a view of the LED street light section with integrated front housing with the rear housing of this invention.
Figure 4A:
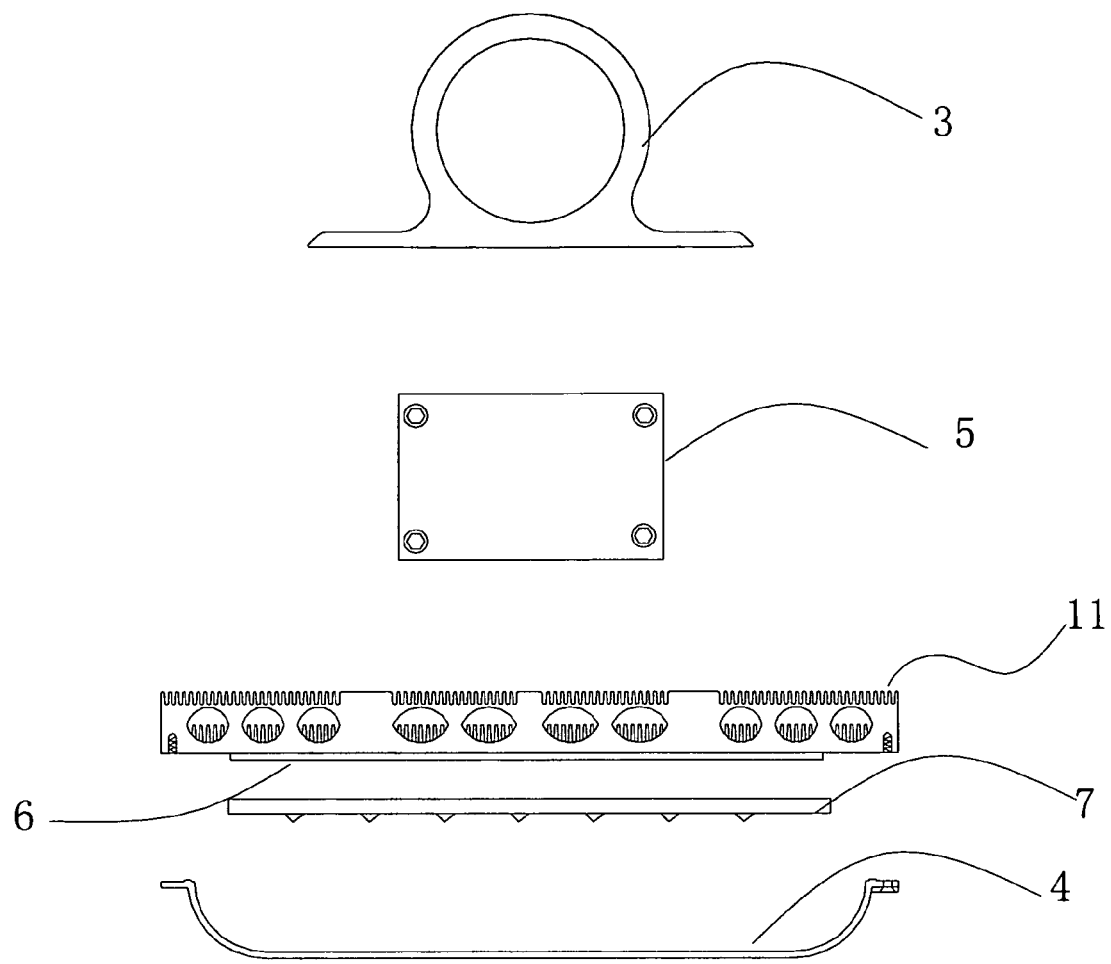
FIG. 4A is an exploded view of FIG. 4.

As shown in FIGS. 3-4A, it is another embodiment of this invention, comprising: main unit 1 of the street light, light pole fixation base 3, clear light cap 4; transformer 5 is fixed on the surface of main unit of the street light; LED light panel 6 is fixed on another surface of the main unit 1 of the street light; couples of heat sinks 11 are installed on surface of the transformer 5 equipped on the main unit 1 of the street light. Couples of through-holes 13 are equipped in the main unit 1 of the street light; the foresaid through-holes 13 are ellipse in shape, and its length is the same as that of the main unit 1 of the street light; couple s of heat sinks 211 are equipped in each through-hole. The heat sinks 211 are made of aluminum with excellent thermal conductive performance. The clear light cap 4 is fixed on front surface of the main unit 1 of the street light, which is free from lowering brightness of the LED light and prevents rainwater from coming into the LED light. A reflector 7 is installed between the clear light cap 4 and the LED light panel 6. The foresaid reflector 7 is designed for equal light transmission from the LED.

With the structure above adopted, couples of through-holes 13 are equipped in the main unit 1 of the street light; couples of heat sinks 211 are equipped in each through-hole 13; the heat from LED lighting is conducted to the heat sinks 211 through the LED light panel 6 made of high thermal conductive material; the heat sinks 211 discharges the heat from the through-hole 13; the other part of heat conducted to back surface of the main unit 1 of the street light is discharged from the heat sinks 11. By this way, it guarantees a sufficient heat elimination for the LED street light achieving a longer lifespan of the LED street light and a less light degradation that can be even neglected. Therefore, the brightness of the LED street light is ensured.

Figure 5:
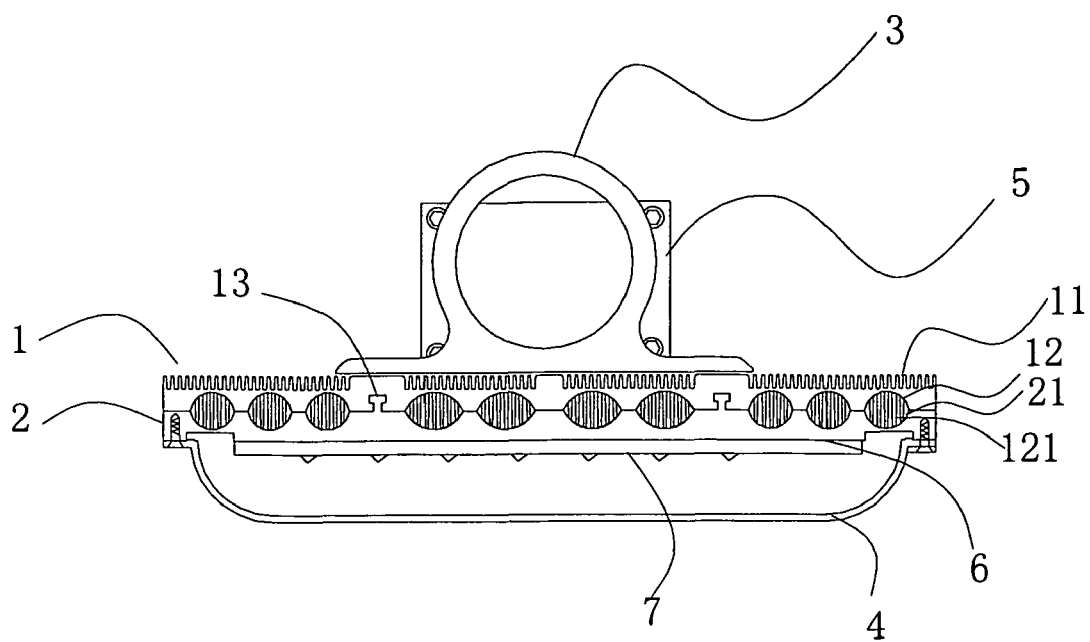
FIG. 5 is a view of the LED street light section with heat sinks equipped in the arch slot of this invention.

As shown in FIG. 5, couples of heat sinks 121 are equipped in the arch slot 12 in the internal surface of the rear housing 1. All the free ends of the foresaid heat sinks 121 contact with the surface of arch slot 21 in the internal surface of the front housing 2. This structure adopted is convenient for eliminating the heat generated during LED working through the heat sinks 121 to ensure a sufficient heat elimination for the LED street light.

Figure 6:
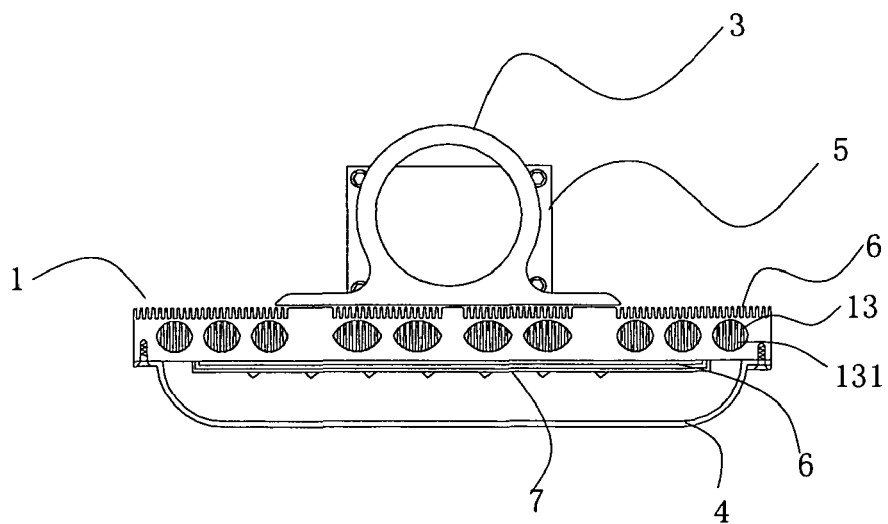
FIG. 6 is a view of the LED street light section with integrated front housing with the rear housing and heat sinks equipped on surface of the through-hole lower part of this invention.
Figure 7:
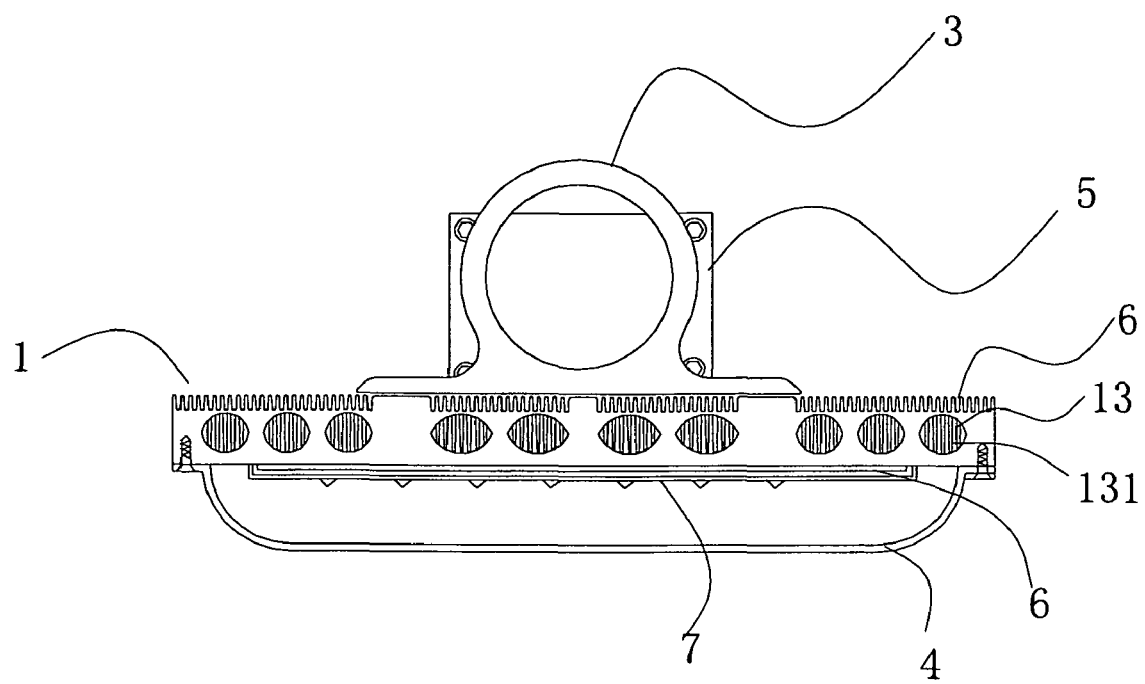
FIG. 7 is a view of the LED street light section with integrated front housing with the rear housing and heat sinks equipped on surface of the through-hole upper part of this invention.

As shown in FIGS. 6-7, couples of heat sinks 131 are equipped on surface of the upper part of the foresaid ellipse through-hole 13, and all the free ends of the heat sinks contacts with surface of lower part of the through-hole; or, the foresaid heat sinks 131 are equipped on surface of lower part of the ellipse through-hole 13, and all the free ends of the heat sinks 131 contacts with surface of upper part of the through-hole. This structure adopted is convenient for eliminating the heat generated during LED working through the heat sinks 121 to ensure a sufficient heat elimination for the LED street light.

Although this invention is described with embodiment, the general technicians on this field are aware that the invention is with many deformations and changes within the scope of this invention's spirit. It is hoped the attached claims include these deformations and changes within the scope of this invention's spirit.

The invention claimed is:
1. A LED street light comprising:
    a front housing wherein an internal surface of the front housing includes at least one slot,
    a rear housing wherein an internal surface of the rear housing includes at least one slot that corresponds to the at least one slot of the front housing,
    a light pole fixation base,
    a clear cap,
    a transformer fixed on the rear housing,
    a LED panel connected with the front housing;
    at least one external heat sink on an external surface of the rear housing; and at least one internal heat sink located within the at least one slot in the front housing.

2. The LED street light of claim 1 wherein the at least one slot on the internal surface of the front housing is arch in shape, and its length is the same as the length of front housing.

3. The LED street light of claim 2 further comprising:
at least two T-shaped convex bars located on the internal surface of the front housing;
at least two T-shaped slots are located on the internal surface of the rear housing and wherein the T-shaped convex bars cooperate with the T-shaped slots to connect the front housing to the rear housing.

4. The LED street light of claim 1 wherein the clear light cap is attached to the front housing and a reflector is installed between the clear light cap and the LED light panel.

5. The LED street light of claim 1 further comprising:
at least one additional internal heat sink located in the slot on the internal surface of the rear housing and wherein the free ends of the one additional internal heat sink located in the slot on the internal surface of the rear housing are in contact with the free ends of the at least one internal heat sink located on the internal surface of the front housing.

6. The LED street light of claim 1 further comprising:
a second foresaid light pole fixation base and
a distribution box installed between the light pole fixation base and the transformer.

7. A LED street light, comprising:
a main unit of the street light,
a light pole fixation base attached to a first surface of the main unit,
a clear light cap,
a transformer attached to the first surface of the main unit,
a LED light panel connected a second surface of the main unit,
at least one external heat sink positioned on the surface of the main unit of the street light, further including at least one through-hole in the main unit of the street light containing at least one internal heat sink in the through-hole.

8. The LED street light of claim 7 wherein at least one through-hole is ellipse in shape and the length of the through-hole is the same as that of the main unit of the street light.

9. The LED street light of claim 7 wherein the clear light cap is equipped on the front housing and a reflector is equipped between the clear light cap and the LED light panel.

10. The LED street light of claim 7 or 8 further comprising:
an additional internal heat sink located in the at least one through-hole wherein the free ends of the internal heat sink contacts with the free ends of the additional internal heat sink.

11. The LED street light of claim 7 further comprising:
a second foresaid light pole fixation base,
and a distribution box installed between the light pole fixation base and the transformer.

12. The LED street light of claims 1-3 wherein the internal heat sink is aluminum.

13. The LED street light of claim 1 wherein the at least one slot on the internal surface of the front housing is arch in shape.

* * * * *